United States Patent [19]

Bertsch et al.

[11] 4,290,939

[45] Sep. 22, 1981

[54] UNSATURATED POLYESTER RESINS AND MOLDING COMPOSITIONS CONTAINING SAME

[75] Inventors: Robert J. Bertsch, Brecksville; Changkiu K. Riew, Akron, both of Ohio

[73] Assignee: The B. F. Goodrich Company, Akron, Ohio

[21] Appl. No.: 134,371

[22] Filed: Mar. 27, 1980

[51] Int. Cl.$^3$ .................... C08L 67/02; C08G 63/20
[52] U.S. Cl. .................... 260/40 R; 525/438; 528/272; 528/288; 528/297; 528/300; 528/303; 528/304; 528/306
[58] Field of Search ............... 528/297, 300, 303, 304, 528/306, 288, 272; 525/438; 260/40 R

[56] References Cited

U.S. PATENT DOCUMENTS 3,431,235  3/1969  Lubowitz .................... 528/296 X
3,850,856  11/1974 Dreyfuss ........................ 528/409

Primary Examiner—Lucille M. Phynes
Attorney, Agent, or Firm—George A. Kap; J. Hughes Powell, Jr.

[57] ABSTRACT

The novel aspect of this invention resides in co-reacting a toughening agent with components of an unsaturated polyester resin in order to introduce the toughening agent into the backbone of the unsaturated polyester resin and thus produce a toughened stable resin. Suitable toughening agents are carboxyl and hydroxyl terminated reactive liquid polymers which are used in amount of 1 to 30, preferably 1 to 15 parts by weight per 100 parts by weight of reactant monomers used to prepare the polyester resin.

24 Claims, No Drawings

UNSATURATED POLYESTER RESINS AND MOLDING COMPOSITIONS CONTAINING SAME

BACKGROUND OF THE INVENTION

Unsaturated polyester resins are useful for making molding compositions which consist of an unsaturated polyester resin, an ethylenically unsaturated copolymerizable monomer, inert mineral fillers, fibrous reinforcing fillers and a catalyst which initiates the cross-linking reaction between the copolymerizable monomer and the unsaturated polyester resin at a chosen molding temperature. They are commonly used in many physical forms, including bulk molding compounds and sheet molding compounds. The use of unsaturated polyester resins in the molding of glass fiber reinforced or other fiber reinforced products enjoys broad application in the manufacture of automotive, industrial and home products.

Unfortunately, the unsaturated polyester resins are inherently brittle and have low resistance to impact. Attempts have been made to improve the brittleness thereof, but with limited success. It has been the normal industry practice to incorporate a flexibilizer in the resin composition, however, this is disadvantageous in that it results in reduction in the mechanical properties thereof which renders it unacceptable in many applications. More recently, inflexibility and low resistance to impact have been improved by blending reactive liquid polymer tougheners, such as vinyl terminated liquid polymers or hydroxyl terminated liquid polymers, with the unsaturated polyester resin before curing. Utility of such toughening agents is limited, however, by their incompatibility with the polyester resins. This is especially true of non-liquid high molecular weight elastomers. Hydroxyl terminated polyepichlorohydrin liquid polymers appear to have better compatibility with the unsaturated polyester resins. Due to the incompatibility between the toughening agents and the unsaturated polyester resins, it has been necessary to blend the two components shortly before the compounding step in the preparation of molding compositions based on polyester resin as the binder. If a blend of a toughening agent and unsaturated polyester resin were allowed to stand for a period on the order of a few days, the components would separate and the blend would have to be reconstituted again.

It has been discovered that compatibility of the toughening agents and the unsaturated polyester resins can be improved by co-reacting reactive liquid polymer tougheners with the reactants to produce unsaturated polyester resin in order to introduce the reactive liquid polymers into the backbone of the unsaturated polyester resins. In fact, it has been discovered that incorporation of the reactive liquid polymers into the backbone of the unsaturated polyester resins improves toughness properties without adversely affecting any physical or mechanical properties of the unsaturated polyester resins compared to systems where the two components are blended.

SUMMARY OF THE INVENTION

This invention relates to novel unsaturated polyester resins containing reactive liquid resin tougheners in the polyester backbone, to molding compositions containing the novel unsaturated polyester resins, and to a process for the preparation of the novel unsaturated polyester resins by reacting hydroxyl terminated and carboxyl terminated reactive liquid polymer tougheners with the reactants of the unsaturated polyester resins, thus incorporating the toughening agents into the unsaturated polyester backbone. The reactants of the unsaturated polyester resins are diacids and/or anhydrides and diols.

DETAILED DESCRIPTION OF THE INVENTION

The novel aspect of this invention resides in the incorporation of hydroxyl and carboxyl terminated reactive liquid polymer tougheners in the backbone of unsaturated polyester resins by co-reacting the toughening agents with the unsaturated polyester resin reactants. In this manner, incompatibility between the toughening agents and the polyester resins is overcome and the resulting polyester resins are greatly improved for toughness without significant adverse affects on physical and mechanical properties.

Unsaturated polyester resins useful in this invention are well known in the art and include those derived by condensation of unsaturated dibasic acids or anhydrides containing 4 to 9 carbon atoms with polyols including dihydroxy and trihydroxy compounds containing 2 to 12 carbon atoms. The polyester may include in the polymeric chain varying proportions of other saturated or aromatic dibasic acids and anhydrides which are not subject to cross-linking. The particular noncross-linking moieties and their proportions will depend upon the desired properties of the final product. Maleic, chloromaleic and fumaric acid may be mentioned as exemplary of unsaturated dibasic acids. Aromatic and saturated acids and anhydrides which are exemplary of noncross-linking moieties within the copolymer include phthalic anhydride, orthophthalic acid, meta-phthalic acid, para-phthalic acid, endomethylene-tetrahydrophthalic acid, tetrachlorophthalic acid, hexachloroendomethylenetetrahydrophthalic acid, adipic acid, sebacic acid, succinic acid, and the like.

Any of a variety of well known polyols including di- and tri-hydroxy compounds containing 2 to 9 carbon atoms, preferably 2 to 6 carbon atoms, can be used for condensation with the diacids to produce polyesters suitable for use in this invention. Preferred compounds, which are mentioned by way of example of the large number of applicable compounds include ethylene glycol, propylene glycol, 1,2-, 1,3-, and 1,4-butadienols, neo-pentyl glycol, diethylene ether diol, trimethylol propane, and the like.

The method by which the unsaturated polyester resins are made is not critical to this invention. The polyester resin is dissolved in a solvent comprising at least one polymerizable monomer which is copolymerizable with the dissolved polyester. The polymerizable monomer not only acts as a solvent but also copolymerizes with the unsaturated groups along the polyester chain. Polymerizable monomers which can be used in thhis invention include polymerizable vinylidene compounds having at least one terminal $CH_2=C<$ group containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl acetate, allyl esters of phthalic, adipic, maleic, malonic, and cyanuric acids.

Styrene and methyl styrene are particularly useful polymerizable monomers. Commercial unsaturated polyester resins are normally sold as a liquid solution with the unsaturated polyester resin dissolved in the polymerizable monomer.

The toughening agents for the polyester resins are the carboxyl terminated liquid polymers and hydroxyl terminated liquid polymers. These toughening agents are elastomeric and have Tgs significantly lower than the polyester resins. This difference appears to promote the desired toughening of the polyester resins. The preferred toughening agents are selected from hydroxyl terminated liquid polymers prepared from epihalohydrins, especially epichlorohydrin.

Liquid carboxyl-terminated polymers may be prepared by free-radical polymerization using carboxyl-containing initiators and/or modifiers as disclosed in U.S. Pat. No. 3,285,949 and German Pat. No. 1,150,205, and by solution polymerization using lithium metal or organometallic compounds and post-treating the polymers to form carboxyl groups, as disclosed in U.S. Pat. No. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

The carboxyl-terminated liquid polymers used may have Brookfield viscosities from about 500 cps to about 2,500,000 cps at 25° C., more preferably from about 5000 cps to about 1,200,000 cps, and have polymeric backbones comprising carbon-carbon linkages. The carboxyl-terminated liquid polymers may have carboxyl equivalent weights (gram molecular weight per carboxyl group) from about 300 to about 4,000, more preferably from about 600 to about 3,000. The carboxyl functional groups are located at least at the ends of a polymer molecule, but there may also be additional group(s) located pendant to a polymer backbone. The average number of total carboxyl groups typically may be from about 1.5 to about 4 groups per molecule, more preferably from about 1.7 to 3 groups per molecule.

Carboxyl-terminated liquid polymers having carbon-carbon backbone linkages may contain polymerized units of at least one vinylidene monomer having at least one terminal $CH_2=C<$ group and selected from (a) monoolefins containing 2 to 14 carbon atoms, more preferably 2 to 8 carbon atoms, such as ethylene propylene, isobutylene, 1-butene, 1-pentene, 1-hexene, 1-dodecene, and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 atoms such as vinyl methyl ether, allyl methyl ether, and the like; and (e) acrylic acids and acrylates having the formula

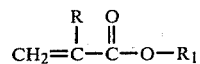

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Preferably $R^1$ is hydrogen or an alkyl radical containing 2 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above may be polymerized readily with from 0% up to about 50% by weight, more preferably from 0% up to about 35% by weight, of at least one comonomer selected from the group consisting of (f) vinyl aromatics such as styrene, α-methyl styrene, chlorostyrene, vinyl toluene, and the like; (g) vinyl nitriles such as acrylonitrile, methacrylonitrile, and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide, and the like; and (j) allyl alcohol and the like. Liquid polymer compositions comprising polymerized units of a major amount of at least one vinylidene monomer listed in (a) to (e) with a minor amount of at least one comonomer listed in (f) to (j) are within the scope of this invention.

Examples of preferred liquid carboxyl-terminated polymers include carboxyl-terminated polyethylene, polyisobutylene, polybutadiene, polyisoprene, poly(ethylacrylate), as well as carboxyl-terminated copolymers of butadiene and acrylonitrile, butadiene and acrylates, and butadiene and styrene. Carboxyl-terminated copolymers of butadiene with acrylonitrile or styrene were found to be especially useful. These polymers may contain from about 50% to about 99% by weight of butadiene, from about 0% to about 40% by weight of acrylonitrile or styrene and from about 1% to about 15% by weight of carboxyl, based upon the total weight of polymer.

The hydroxyl-terminated liquid polymers can also be prepared in several different ways. For instance, carboxyl-terminated liquid polymers can be reacted with ethylene oxide in the presence of a tertiary amine catalyst, as described in the Siebert U.S. Pat. No. 3,712,916, or with a diol in presence of an acid catalyst, as described in the Siebert U.S. Pat. No. 3,699,153. These reactive liquid polymers have Brookfield viscosity at 25° C. in the range of 500 to about 100,000,000, preferably 5,000 to 2,000,000.

Hydroxyl terminated liquid polymers containing sulfur linkages near terminal portions thereof can be prepared by photopolymerizing at least one alkyl acrylate in the presence of at least one alkyl acrylate in the presence of a hydroxyl-containing disulfide. Examples of suitable hydroxyl-containing disulfides include 2-hydroxyethyl disulfide, 3-hydroxypropyl disulfide, and the like. Excellent results were obtained using 2-hydroxyethyl disulfide. The disulfide acts both as a polymerization initiator and as a polymerization modifier. The amount of hydroxyl-containing disulfide will vary according to the desired polymeric molecular weight but typically is from about 1 to 20 weight percent, more preferably from 1 to 10 weight percent, based upon total monomeric weight.

Ultraviolet (UV) radiation suitable for use in this method have a wave length from about 1850 Å to about 6000 Å, more preferably from about 2,400 Å to about 4,000 Å. Common sources of UV radiation include mercury lamps and arcs, carbon arcs and hydrogen discharge tubes. In some cases, a sensitizer may be useful in catalytic amounts to accelerate the photopolymerization, including ketones such as acetone, benzophenone, and the like.

The photopolymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol, and the like. Well known suspension techniques comprise suspending the monomeric material, preferably already mixed with the hydroxyl-containing disulfide, in the form of small particles in a non-solvent liquid such as water, together with a suspending agent to aid in maintaining the particles separate from one another during polymerization. Suitable suspending agents include starch, carboxymethylcellulose, and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkaryl sulfonates, and the like.

Hydroxyl-terminated liquid polymers containing sulfide linkages near the terminal portions of the polymer are prepared by thermal polymerization, typically at about 80°–90° C., of at least one alkyl acrylate in the presence of at least one hydroxyl-containing disulfide described heretofore, and an initiator such as azoisobutyronitrile. Solvents, suspending agents, sensitizers, etc., may be used, as described heretofore.

Air or oxygen has an inhibiting effect on the reactions for preparing hydroxyl terminated liquid polymers and preferably is excluded from the reaction vessel. Therefore, the reaction vessel desirably is flushed with nitrogen before the vessel is charged and a nitrogen purge may be continued if necessary to exclude air during polymerization. The reaction generally is conducted with stirring at about 80°–90° C., with cooling provided if necessary. The polymerization rate may be monitored by withdrawing reaction mixture samples at periodic intervals for percent conversion analysis. The reaction can be run to 100% conversion, but it generally is more economical to run to about 70–98% conversion and recover unreacted monomer for reuse. The hydroxyl-containing liquid polymer may be purified by vacuum distillation or by washing with water in order to remove the unreacted hydroxyl-containing disulfide, followed by drying the polymer. The structure of the hydroxyl-containing liquid polymer can be confirmed by infrared analysis, together with well known wet chemical methods for determination of hydroxyl and sulfur content. Number average molecular weights ($\overline{M}_n$) can be measured using vapor pressure osmometry, gel permeation chromatography, or the like.

The alkyl acrylate liquid polymers containing both terminal and random hydroxyl functionality may have molecular weights ($\overline{M}_n$) from about 1,000 to about 6,000 as determined by cryoscopic, ebullioscopic or osmometric methods; more preferably the molecular weights may be from about 2,000 to about 4,000. The hydroxylated liquid alkyl acrylate polymers may have Brookfield viscosities at 25° C. from about 50,000 cps to about 2,000,000 cps, more preferably from about 200,000 cps to about 1,000,000 cps.

The hydroxylated liquid acrylate polymers contain polymerized therein at least about 65 wt. %, more preferably at least about 85 wt. %, of at least one alkyl acrylate wherein the alkyl group contains from 3 to 10 carbon atoms, more preferably from 3 to 8 carbon atoms. The alkyl acrylate forms the backbone of the hydroxylated liquid polymer. Examples of suitable alkyl acrylates as the primary components of the polymer backbone include n-butyl acrylate, n-hexyl acrylate, 2-ethylhexyl acrylate, and the like, and mixtures thereof. Excellent results were obtained using n-butyl acrylate. The hydroxylated alkyl acrylate liquid polymers can also contain from about 1 to about 20 weight percent N-vinyl-2-pyrrolidone, preferably from about 2 to about 10%. The balance of the polymer, typically from about 0 to 30 weight percent can be copolymerized therein at least one other olefinically unsaturated monomer, more preferably at least one other vinylidene monomer (i.e., a monomer containing at least one terminal $CH_2=C<$ group per molecule) in the polymeric backbone.

Preferred vinylidene comonomers in the polymeric backbone include (a) dienes containing 4 to 10 carbon atoms, more preferably 4 to 8 carbon atoms, such as butadiene, isoprene, 2-isopropyl-1,3-butadiene, chloroprene, and the like; (b) vinyl nitriles containing 3 to 6 carbon atoms such as acrylonitrile, methacrylonitrile, and the like; and (c) acrylates such as acrylic acid, ethyl acrylate, dodecyl acrylate, octadecyl acrylate, methoxyethyl acrylate, butoxyethyl acrylate, hexylthioethyl acrylate, $\beta$-cyanoethyl acrylate, cyanooctyl acrylate, methyl methacrylate, ethyl methacrylate, octyl methacrylate, and the like. Comonomeric mixtures may also be used. Excellent results were obtained using butadiene, ethyl acrylate, and/or acrylonitrile comonomers together with n-butyl acrylate as the principal monomer.

Other suitable vinylidene comonomers include (d) vinyl aromatics such as styrene, methyl styrene, chlorostyrene, and vinyl toluene; (e) vinyl and allyl esters of carboxylic acids containing 2 to 8 carbon atoms such as vinyl acetate, vinyl propionate, and allyl acetate; (f) vinyl and allyl ethers of alkyl radicals containing 1 to 8 arbon atoms such as vinyl methyl ether and allyl methyl ether; and (g) monoolefins containing 2 to 14 carbon atoms, more preferably 2 to 8 carbon atoms, such as ethylene, propylene, isobutylene, 1-butene, 1-pentene, 1-hexene, 1-dodecene, and the like.

Also suitable as vinylidene comonomers are (h) vinyl halides such as vinyl bromide, vinyl chloride, and the like; (i) divinyls and diacrylates such as divinyl benzene, divinyl ether, diethylene glycol diacrylate, and the like; (j) amides of $\alpha,\beta$-olefinically unsaturated carboxylic acids containing 2 to 8 carbon atoms such as acrylamide, and the like; (k) hydroxyl-containing vinylidene monomers for the purpose of including some random hydroxyl functionality, as defined heretofore, such as 2-hydroxyethyl acrylate, allyl alcohol, vinyl benzyl alcohol, and the like; and (l) other vinylidene monomers such as bis(β-chloroethyl) vinyl phosphonate, diacetone acrylamide, and the like. Excellent results were obtained using 2-hydroxyethyl acrylate and diacetone acrylamide.

Epihalohydrin polymers used as tougheners in this invention can be an epihalohydrin homopolymer, a copolymer of two or more epihalohydrin monomers, or a copolymer of an epihalohydrin monomer(s) with an oxide monomer(s).

The epihalohydrin monomers have the formula

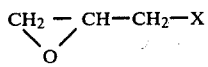

where X is Cl, Br, I or F. More preferably, X is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1,2-epoxy butane; 4-bromo-1,2-epoxy butane; 1-(1,3-dichloroisopropoxy)-2,3-epoxypropane; 4,4,4-trichloro-1,2-epoxy butane; 1-bromoethyl glycidyl ether; 1,1,1-trichloroethyl glycidyl ether; 1,1,1-trifluoroethyl glycidyl ether; 1,2-epoxy-2-methyl-4,6,6,6-tetrachlorohexane; 1,2-epoxy-4-oxo-8,8,8-trichlorooctane, and the like.

The oxide monomers contain a cyclic oxy ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate and glycidyl methacrylate; allyl glycidyl ether; styrene oxide; and 4- and 5-membered oxy ring compounds such as Furan and methyl substituted Furan, and the like. Of the oxide monomers, the alkylene oxides containing about 2 to 8 carbon atoms are preferred.

Examples of more preferred epihalohydrin polymers are polyepichlorohydrin, polyepibromohydrin, epichlorohydrin-epibromohydrin copolymer, epichlorohydrinethylene oxide copolymer, epibromohydrin-ethylene oxide copolymer, epichlorohydrin-propylene oxide copolymer, and epichlorohydrin-ethylene oxide-propylene oxide terpolymer. Excellent results have been obtained with a homopolymer of epichlorohydrin.

Copolymers of epihalohydrin monomers and oxide monomers comprise at least 50% to 100% by weight (i.e., homopolymers) of polymerized units of epihalohydrin monomer(s), and up to 50% by weight of polymerized units of an oxide monomer(s). Preferably, the polymers contain from about 65% to 100% by weight of polymerized epihalohydrin monomer(s).

Epihalohydrin polymers suitable for use as tougheners for unsaturated polyester resins are of low molecular weight and will vary from fluid liquids to thick semisolids. The number average molecular weight ($M_n$) of such polymers normally will vary from about 800 to about 50,000, preferably from about 1000 to about 30,000. The epihalohydrin polymers have a bulk viscosity of from about 500 cps to about 50,000,000 cps, measured at 25° C. using a Brookfield Viscometer. To facilitate handling, the bulk viscosity of the epihalohydrin polymer can be reduced by blending the polymer with the dissolving polymerizable monomer. This may be desirable for high viscosity polymers.

Epihalohydrin polymers suitable for use in this invention can be prepared according to U.S. Pat. Nos. 3,850,856 and 3,850,857.

The level of hydroxyl or carboxyl terminated polymers that is used in the preparation of the polyester resins is from about 1 to about 30 parts by weight, preferably 1 to 15 parts by weight, based on 100 parts of reactant monomers used to prepare the polyester resin. The reactant monomers include the unsaturated dibasic acids or anhydrides, and the polyols.

In the preparation of the novel polyester resins, the acid and/or anhydride are charged into a reaction vessel, together with carboxyl or hydroxyl terminated liquid polymer, propylene glycol, and an inhibitor such as quinone or hydroquinone. These reagents are heated to about 175° to 250° C. and reacted under a blanket of nitrogen with removal of water. The reaction is complete when the desired amount of water has been removed. The mixture can be cooled to about 110° to 170° C. in order to add a portion of the remaining acid or anhydried following which, heating is resumed and water is removed until the desired acid number is reached. With carboxyl terminated liquid polymers, it is desired to continue the reaction until an acid number in excess of about 20 is reached. The acid number is not critical when hydroxyl terminated liquid polyepihalohydrin polymers are used, nevertheless, it should be no less than 10. When the desired acid number is reached, the material can be cooled to about 160° to 200° C., poured into a metal pan, and allowed to cool to room temperature as it solidifies. The product at this point is a modified polyester resin containing toughening agents in the polyester resin backbone. The solidified product is crushed or broken up into small pieces and dissolved in a polymerizable monomer, such as styrene, to yield a solution of about 20 to 80% solids. Preferred acid number for this product is 10 to 35 and preferred viscosity is 100 to 2000 cps.

In addition to the polyester resin containing toughening agent in its backbone and the polymerizable monomer, the molding compositions of this invention can include other ingredients such as fillers, mold lubricants, catalysts, thickening agents, low profile additives, reinforcing fibers, flame and smoke retardants, and coloring agents.

As regards the filler materials suitable for use in the compositions of this invention, these may include conventional inorganic fillers such as carbonates, sulfates, phosphates, silica, silicate, micromica, carborundum, asbestos, glass, sandstone, graphite, and the like, reduced to a fine powder, as well as organic materials such as polyolefins, polyvinyl chloride, carbon black and acetylene black, polyacrylate, polymethacrylates, solid polyesters, phenol-formaldehyde resins, urea-formaldehyde resins, polyformal resins, polyamid resins, used in the form of very fine powder to granular size. The particles may sometimes fuse during the final cross-linking process.

As reinforcing fibers, there may be used inorganic fibers such as glass fibers, asbestos fibers; vegetable fibers such as flax, hemp, cotton, and the like; and organic fibers such as nylon, polyester, aromatic polyamide, and the like. The reinforcing fibers may be present as chopped fibers having lengths of from about 0.1 to about 3 inches or as woven mats, non-woven mats, and the like. Sheet molding compounds will normally have chopped fibers of from about 0.5 to about 2 inches. The quantity of reinforcing fibers used will normally be from about 5 to 70 percent, preferably from 15 to 50 percent of fibers of the total weight of the composition.

Mold lubricants which may be employed in the preparation of the compositions of this invention include mold lubricants well known in the art and the choice is not critical. There may be mentioned, by way of example, zinc stearate, calcium or magnesium stearate or oleate and zinc oleate. In some instances, the mold lubricant may be omitted as where organic fillers having the property of being self-lubricating, such as polyolefins, polyvinylchloride, and the like, are employed.

Known chemical thickeners are the oxides and hydroxides of the metals of main group II of the Periodic Table, preferably the oxides and hydroxides of magnesium and calcium, to which small amounts of water are added optionally. Magnesium oxide was found to be an especially desirable thickener. The thickeners are normally used at levels of from about 1 to about 3 parts by weight per 100 parts of the combined weight of polyester resin and polymerizable monomer.

Examples of suitable catalysts are benzoyl peroxide, tertiary butyl peroxide, cyclohexanone peroxide, tertiary butyl peroctoate, tertiary butyl perbenzoate, azoisobutyrodinitrile, cumene hydroperoxide, and the like. The catalysts are normally used at levels of from about 0.5 to about 3 parts by weight per 100 parts of the combined weight of polyester resin and polymerizable monomer.

Many applications for which unsaturated polyester compositions are used are not critical with respect to surface smoothness, but in certain uses, such as automobile surface parts, for example, the characteristic rough surface is objectionable. Often it is desirable to paint moldings used in automotive applications, for example, to achieve a smooth, metal-like, high-gloss appearance. To achieve a smooth surface, it is customary to use a low-shrink additive, which is commonly referred to as a low-profile additive. Low-profile additives are widely used in sheet molding compounds.

Low-profile additives which may be used in the unsaturated polyester resin compositions of this invention are well known in the art. They include thermoplastic homopolymers of vinylidene monomers containing 2 to 12 carbon atoms. Examples of homopolymers of alkyl acrylates and methacrylates such as methyl acrylate, ethyl acrylate, methyl methacrylate, ethyl methacrylate, butyl methacrylate, and the like; vinyl esters such as vinyl acetate, and the like; vinyl halides such as vinyl chloride, and the like; vinyl aromatics such as styrene and the like. Thermoplastic copolymers are also suitable for use as a low-profile additive such as copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methylol acrylamide and cetyl stearyl methacrylate. Copolymers of vinyl halides and vinyl esters are also useful as low-profile additives such as vinyl chloride/vinyl acetate copolymers, and the like. Other useful examples of low-profile additives are styrene/acrylonitrile copolymers, cellulose acetate butyrate, and cellulose acetate propionate. Excellent results were obtained using polyvinyl acetate.

Low-profile additives are normally supplied in a solution with a polymerizable monomer, such as styrene. After cure, the low-profile additive exists as fine particles dispersed in the polyester matrix. Low-profile additives may be used at a level of from about 5 to about 40 parts by weight based on 100 parts by weight of the combined weight of the unsaturated polyester resin and the polymerizable monomer.

To prepare the novel molding compositions of this invention, normal procedures for preparing unsaturated polyester molding compositions are used. The remainder of the preparation will vary somewhat depending on the type of molding composition desired, such as sheet molding, bulk molding, hand lay-up, spray-up, vacuum bag molding, injection molding, casting, and the like.

For sheet molding compounds, a typical preparation procedure is to first mix the liquid ingredients together. The liquid polymer may be added as is or mixed with the polymerizable monomer to reduce its viscosity and facilitate handling. The liquid ingredients are then mixed with the fillers and mold release agents for about 15 to 20 minutes in a mixer such as a Cowles mixer. The catalyst is then added to the mix and mixed for about 2 to 5 minutes. The thickening agent is then added and mixed for about 1 to 3 minutes. The resin composition is then spread onto non-adhering sheets, such as polyethylene. Chopped glass fibers are then sprayed onto the sheets of resin compound and the sheets brought together to form a composite. The composite is passed through compression rollers to effect impregnation of the glass by the resin mix. The sheets of the composite are then allowed to thicken with time (maturation) for about 1 to 3 days at about 32° C. For sheet molding applications, the resin composition should thicken to a viscosity of from about $30 \times 10^6$ cps to about $100 \times 10^6$ cps, preferably from about $40 \times 10^6$ cps to about $80 \times 10^6$ cps before molding under heat and pressure. The thickened sheets are then cut into the desired size and molded and cured at an elevated.

Co-reacting a toughening agent with compounds of the polyester resin results in a resin having excellent storage properties. The polyester resin of this invention can be stored for long periods of time before the catalyst and the thickening agent are added. This is a vast improvement over past practice which required prompt use of the resin after it was blended with a toughening agent. If such a prior art resin were allowed to stand for any appreciable period of time, the toughening agent would separate from the mix.

In order to evaluate the compositions of this invention for toughness and other properties, standard industry tests were used. ASTM tests were used for conventional mechanical properties such as D-790 for flexure and D-638 for tension, both with nominal 6.35 mm thick samples. Izod testing was done on samples that were unnotched and impacted normal to the molding surface. Other tests were used to measure Barcol hardness. Fracture toughness was evaluated by the Gardner dart impact test and by fracture surface energy. The Gardner impact and fracture energy tests warrant more detailed description.

For the Gardner impact test, an instrument is used which comprises a base plate, a round-nosed steel rod impact weight, a slotted tube having inch-pound graduations in which the rod is lifted and dropped, and a bracket to hold the tube in a vertical position. Impact resistance is determined by subjecting either side of a sample panel to an impact of up to 36.16 joules, depending upon the weight dropped. The sample panel is placed over a 12.7 mm hole in the base plate; the steel rod weight is raised by lifting an attached pin until the pin coincides with the desired inch-pounds graduation mark on the slotted tube, and then dropped. The sample panel is examined for cracking or failure after each impact. The test used a 1.59 mm radius dart on a 6.35 mm sample panel. A two-pound weight was dropped from various heights onto the ring supported sample. The resultant damage was determined by detecting cracking on the reverse side of the sample. The detection was made relatively easy by inking the reverse side and then wiping it clean; the ink clearly identified the local cracking from the impact. The dart weight multiplied by the drop height at the onset of detectable cracking determined the reported Gardner impact value in inch-pounds.

Articles which describe the fracture surface energy test in significant detail are J. P. Berry, J. of Applied Physics, Vol. 34, p. 62 (1963) and F. J. McGarry and L. J. Broutman, J. of Applied Polymer Science, Vol. 8, p. 589 (1965).

Presented below are examples which illustrate the invention described herein more specifically. These examples are not to be construed as limiting the scope of this invention in any manner whatsoever.

EXAMPLE 1

Two samples of modified polyester resin were prepared by co-reacting a carboxyl and hydroxyl terminated liquid polymer with the reactants of a polyester resin. These two samples were compared to a control sample which was prepared in the same manner but without incorporation of a toughening agent. Components of the samples and amounts thereof are given in parts by weight in Table I, below, as well as certain properties of the resulting modified polyester resins:

TABLE I

|  | Sample A | Sample B | Control |
| --- | --- | --- | --- |
| Isophthalic Acid | 249 | 249 | 249 |
| Maleic Anhydride | 294 | 294 | 294 |
| Propylene Glycol | 376.2 | 366 | 366 |
| CTR Liquid Polymer | 28.0 | — | — |
| HTR Liquid Polymer | — | 57.2 | — |
| Quinone | 0.13 | 0.13 | 0.13 |
| Hydroquinone | 0.25 | 0.25 | 0.25 |
| Styrene | 560 | 560 | 560 |
| Acid Number | 31.2 | 22 | 23 |
| Viscosity at 27° C., cps | 460 | 530 | 350 |

In Sample A, mole ratio of the reagents was as follows: 1.5 moles isophthalic acid, 3.0 moles maleic anhydride, and 4.95 moles propylene glycol. Same molar ratios were used in preparing Sample B and the Control with the exception of using 4.8 moles of propylene glycol. The quinone in the above samples functions as an inhibitor to prevent cross-linking of maleic anhydride, which provides unsaturation. Styrene is a reactive diluent for the solid polyester resin and hydroquinone is added to inhibit premature cross-linking of styrene and unsaturated polyester resin. The CT reactive liquid polymer used was a butadiene-acrylonitrile polymer containing 27% acrylonitrile, with a viscosity of 625,000 cps at 25° C., 2.40% carboxyl content, molecular weight of 3,500 and functionality of 1.85. The hydroxyl terminated reactive liquid polymer used was an epichlorohydrin liquid polymer with a viscosity of 3,000,000 cps at 25° C., hydroxyl number of 18, and number average molecular weight of 3000. Samples A and B continue to show good storage stability and remain homogeneous for over 6 months.

Preparation procedure was straight forward. The isophthalic acid, liquid polymer, quinone and propylene glycol were placed in a 2-liter reaction vessel. Under a steady stream of nitrogen, the reagents were reacted at 210° C. until 49 mls of water was distilled. The mixture was cooled to 140° C. and the maleic anhydride was charged. Heating was resumed and water was removed until the desired acid number was reached. With the carboxyl terminated liquid polymer as the toughening agent, the acid number should preferably be above 20. The material was then cooled to 180° C., poured into a metal pan, and then cooled to room temperature to solidify it. The modified polyester resin was broken up into small pieces and dissolved in styrene along with hydroquinone at room temperature. Optimum properties were obtained at the indicated levels of the reactive liquid polymers.

Each resin sample of Example 1 in amount of 400 grams was mixed with 2 grams of 10% cobalt naphthenate in styrene and 8 grams of methyl ethyl ketone peroxide. The mixture was blended thoroughly under vacuum to remove all the air, poured into Teflon-lined molds measuring 0.64 cm×20.32 cm×25.4 cm, and cured for 1 hour at 60° C. and then for 1 hour at 120° C. The material was removed from the molds and tested. Results of the tests are given in Table II, below, for molding compositions prepared from resin Samples A, B and the Control, and identified as such:

TABLE II

|  | Sample A | Sample B | Control |
| --- | --- | --- | --- |
| Barcol Hardness | 49 | 46 | 47 |
| Gardner Impact (J) | 0.90 | 0.13 | 1.13 |
| Fracture Surface Energy (J/m$^2$) | NA | 77 | 70 |
| Heat Dist. Temp. (°C.) | 95 | 112 | 112 |
| Tensile Strength (MPa) | 72.5 | 79.0 | 64.9 |
| Modulus (GPa) | 1.71 | 2.03 | 1.67 |
| Elongation (%) | 0.37 | 0.38 | 0.40 |
| Flexural Strength (MPa) | 66.1 | 57.8 | 54.9 |
| Modulus (GPa) | 3.85 | 3.71 | 3.77 |
| Strain (%) | 1.9 | 1.8 | 1.6 |

The above test results show that toughness is improved for the compositions containing reactive liquid polymers. Significant increases in both tensile and flexural strength are obtained as well as an increase in the fracture surface energy. Barcol hardness, heat distortion temperature and tensile and flexural modulus are not significantly affected by the modification. Processing characteristics, such as cure rate, are not significantly affected by incorporation of the toughening agent. Gardner impact shows little change in the modified material.

EXAMPLE 2

Another set of samples were prepared as in Example 1 to determine effectiveness of co-reacting a carboxyl or a hydroxyl terminated liquid polymer with polyester resin reactants versus a controlled sample devoid of any toughener. Reagents and amounts thereof, in parts by weight, together with physical properties of the modified resins, are given in Table III below:

TABLE III

|  | Sample C | Sample D | Control |
|---|---|---|---|
| Isophthalic Acid | 332 | 332 | 332 |
| Maleic Anhydride | 196 | 196 | 196 |
| Propylene Glycol | 334.4 | 324.3 | 324.3 |
| CTR Liquid Polymer | 53.2 | — | — |
| HTR Liquid Polymer | — | 53.2 | — |
| Quinone | 0.13 | 0.13 | 0.13 |
| Hydroquinone | 0.25 | 0.25 | 0.25 |
| Styrene | 535 | 535 | 535 |
| Acid Number | 31.2 | 22.2 | 15.0 |
| Viscosity at 27° C., cps | 860 | 380 | 530 |

The mol ratios of the resin reactants were 2 moles of the isophthalic acid, 2 moles of maleic anhydride and 4.4 moles of propylene glycol for Sample C and 4.27 moles for Sample D. Same reactive liquid polymers were used as in Example 1.

After curing the resins, the following results given in Table IV, below, were obtained with respect to mechanical properties thereof:

TABLE IV

|  | Sample C | Sample D | Control |
|---|---|---|---|
| Barcol Hardness | 47 | 47 | 50 |
| Gardner Impact (J) | 0.90 | 1.70 | 1.13 |
| Fracture Surface Energy (J/M²) | 98 | 63 | 63 |
| Heat Dist. Temp. (°C.) | 73 | 90 | 92 |
| Tensile |  |  |  |
| Strength (MPa) | 27.17 | 30.37 | too brittle |
| Modulus (GPa) | 3.82 | 3.65 | too brittle |
| Elongation (%) | 0.73 | 0.85 | too brittle |
| Flexural |  |  |  |
| Strength (MPa) | 64.08 | 93.70 | 78.55 |
| Modulus (GPa) | 3.93 | 4.04 | 4.23 |
| Strain (%) | 1.8 | 2.7 | 2.6 |

As in Example 1, the modified resins show improved toughness properties over the control. Sample D, containing the liquid polyepichlorohydrin, showed a significant increase in the Gardner impact. Sample C, containing the carboxyl terminated liquid poly(-butadiene/acrylonitrile), showed a significant increase in fracture surface energy. As in Example 1, the incorporation of the reactive liquid polymers does not adversely affect other mechanical properties. The fact that the Control Samples were too brittle to obtain accurate tensile properties while the modified resins could be easily tested is another indication of improvement in the toughness of the resin.

EXAMPLE 3

Typical molding compositions for sheet molding compounds (SMC) were prepared by mixing the ingredients given in parts by weight in Table V, below, then matured and cured.

TABLE V

|  | Novel Mold. Comp. | Control |
|---|---|---|
| Sample C Resin | 65 | — |
| Hatco 13031 Resin | — | 65 |
| LP40A | 35 | 35 |
| Calcium Carbonate | 150 | 150 |
| t-Butyl Peroxide | 0.25 | 0.25 |
| t-Butyl Perbenzoate | 0.5 | 0.5 |

TABLE V-continued

|  | Novel Mold. Comp. | Control |
|---|---|---|
| Magnesium Oxide | 3 | 3 |
| Zinc Stearate | 4 | 4 |
| Chopped Glass Fiber, 1" length | 70 | 70 |

The LP40A material was a low profile additive, polyvinylacetate in styrene, whereas calcium carbonate and glass fiber were fillers. Zinc stearate functioned as a mold release agent whereas the peroxide and the perbenzoate acted as free radical sources.

Mechanical properties of the novel molding composition and the control are given in Table VI, below:

TABLE VI

|  | Novel Comp | Control |
|---|---|---|
| Unnotched Broadside Izod (J/cm) | 4.37 | 3.64 |
| Gardner Impact (J) | 0.79 | 0.56 |
| Flexural - |  |  |
| Stress (MPa) | 132.9 | 116.5 |
| Modulus (GPa) | 8.89 | 7.92 |
| Strain (%) | 2.3 | 2.2 |
| Energy (J) | 1.73 | 1.48 |
| Tensile - |  |  |
| Stress (MPa) | 53.7 | 59.7 |
| Modulus (GPa) | 8.20 | 8.89 |
| Elongation (%) | 1.5 | 1.6 |

The above test results compare the performance of the modified resin to a widely used commercial unsaturated polyester resin (Hatco 13031) in a typical sheet molding compound (SMC) recipe. The novel molding compound shows significant increases in unnotched Broadside Izod and Gardner Impact. Flexural energy, the area under the stress-strain curve, which is another measure of toughness, has also been improved. As with the previous examples, the other mechanical properties are not adversely affected in the novel model compounds.

We claim:

1. In the process for preparing polyester resins which involves the reaction of an acid and/or anhydride with a hydroxyl-containing compound which forms ester groups upon reaction with the acid and/or anhydride, the improvement comprising co-reacting a carboxyl or a hydroxyl terminated reactive liquid polymer with said acid and/or anhydride and the hydroxyl containing compound.

2. Process of claim 1 wherein amount of the reactive liquid polymer is 1 to 30 parts by weight per 100 parts of said acid and/or anhydride and said hydroxyl-containing compound, said carboxyl terminated liquid polymer has a viscosity of 500 to 2,500,000 cps at 25° C. with an average carboxyl group per molecule of 1.5 to 4, and said hydroxyl terminated liquid polymer has a viscosity of 500 to about 100,000,000 cps at 25° C. and a number average molecular weight of 1,000 to 6,000.

3. Process of claim 2 wherein said acid is a diacid and said acid and said anhydride are unsaturated and contain 4 to 9 carbon atoms per molecule, and said hydroxyl-containing compound is a polyol selected from dihydroxyl and trihydroxyl compounds containing 2 to 12 carbon atoms per molecule.

4. Process of claim 3 wherein the polyol contains 4 to 6 carbon atoms per molecule, said carboxyl terminated liquid polymer has a viscosity of 5000 to 1,200,000 cps with average number of carboxyl groups per molecule of 1.7 to 3, and the hydroxyl terminated liquid polymer has a viscosity of 5,000 to 2,000,000 cps and a number average molecular weight of 2,000 to 4,000.

5. Process of claim 1 wherein amount of the liquid polymer is 1 to 30 parts by weight per 100 parts of said acid and/or anhydride and said hydroxyl-containing compound; said acid is a diacid and said acid and said anhydride are unsaturated and contain 4 to 9 carbon atoms per molecule; said hydroxyl-containing compound is a polyol selected from dihydroxyl and trihydroxyl compounds containing 2 to 12 carbon atoms per molecule; the hydroxyl terminated liquid polymer comprises epihalohydrin polymer which has a number average molecular weight of about 800 to 50,000 and viscosity of about 500 to 50,000,000 cps; and the carboxyl terminated liquid polymer has a viscosity of 500 to 2,500,000 cps with an average carboxyl group per molecule of 1.5 to 4.

6. Process of claim 5 wherein the hydroxyl terminated liquid polymer has molecular weight of about 2,000 to 15,000 and amount of the carboxyl and hydroxyl terminated liquid polymer is about 1 to 15 parts per 100 parts of the diacid and/or anhydride and the polyol, said epihalohydrin polymer is selected from homopolymers of epihalohydrin monomer, copolymers of epihalohydrin monomer and an oxide monomer containing a cyclic oxy ring, and mixtures thereof.

7. Modified polyester resin which is a reaction product of an acid and/or anhydride, hydroxyl-containing compound which forms ester groups upon reaction with the acid and/or anhydride, and a carboxyl or hydroxyl terminated reactive liquid polymer.

8. Resin of claim 7 wherein amount of the liquid polymer is 1 to 30 parts by weight per 100 parts of said acid and/or anhydride and said hydroxyl-containing compound, said carboxyl terminated liquid polymer has a viscosity of 500 to 2,500,000 cps with an average carboxyl group per molecule of 1.5 to 4, and said hydroxyl terminated liquid polymer has a viscosity of 500 to about 100,000,000 cps and a number average molecular weight of 1,000 to 6,000.

9. Resin of claim 8 wherein said acid is a diacid and said acid and said anhydride are unsaturated and contain 4 to 8 carbon atoms per molecule, and said hydroxyl-containing compound is a polyol selected from dihydroxyl and trihydroxyl compounds containing 2 to 12 carbon atoms per molecule.

10. Resin of claim 9 wherein the polyol contains 4 to 6 carbon atoms per molecule, said carboxyl terminated liquid polymer has a viscosity of 5000 to 1,200,000 cps with average number of carboxyl groups per molecule of 1.7 to 3, and the hydroxyl terminated liquid polymer has a viscosity of 5,000 to 2,000,000 cps and a number average molecular weight of 2,000 to 4,000.

11. Resin of claim 7 wherein amount of the liquid polymer is 1 to 30 parts by weight per 100 parts of said acid and/or anhydride and said hydroxyl-containing compound; said acid is a diacid and said acid and said anhydride are unsaturated and contain 4 to 9 carbon atoms per molecule; said hydroxyl-containing compound is a polyol selected from dihydroxyl and trihydroxyl compounds containing 2 to 12 carbon atoms per molecule; the hydroxyl terminated liquid polymer comprises epihalohydrin polymer which has a number average molecular weight of about 800 to 50,000 and viscosity of about 500 to 50,000,000 cps; and the carboxyl terminated liquid polymer has a viscosity of 500 to 2,500,000 cps with an average carboxyl group per molecule of 1.5 to 4.

12. Resin of claim 11 in a solution of polymerizable monomer containing about 20 to 80% solids, wherein the hydroxyl terminated liquid polymer has molecular weight of about 2,000 to 15,000 and amount of the carboxyl and hydroxyl terminated liquid polymer is about 1 to 15 parts per 100 parts of the diacid and/or anhydride and the polyol, said epihalohydrin polymer is selected from homopolymers of epihalohydrin monomer, copolymers of epihalohydrin monomer and an oxide monomer containing a cyclic oxy ring, and mixtures thereof.

13. Molding composition comprising polyester resin and a particulate filler, said polyester resin being the reaction of an acid and/or anhydride with a hydroxyl-containing compound which forms ester groups upon reaction with the acid and/or anhydride, the improvement comprising co-reacting a carboxyl or a hydroxyl terminated liquid polymer with said acid or anhydride and the hydroxyl containing compound.

14. Composition of claim 13 wherein amount of the liquid polymer is 1 to 15 parts by weight per 100 parts of said acid and/or anhydride and said hydroxyl-containing compound, said carboxyl terminated liquid polymer has a viscosity of 500 to 4, and said hydroxyl terminated liquid polymer has a viscosity of 500 to 2,500,000 cps with an average carboxyl group per molecule of 1.5 to 4, and said hydroxyl terminated liquid polymer has a viscosity of 500 to about 100,000,000 cps and a number average molecular weight of 1,000 to 6,000.

15. Composition of claim 14 wherein said acid is a diacid and said acid and said anhydride are unsaturated and contain 4 to 9 carbon atoms per molecule, and said hydroxyl-containing compound is a polyol selected from dihydroxyl and trihydroxyl compounds containing 2 to 12 carbon atoms per molecule.

16. Composition of claim 15 wherein the polyol contains 4 to 6 carbon atoms per molecule, said carboxyl terminated liquid polymer has a viscosity of 5000 to 1,200,000 cps with average number of carboxyl groups per molecule of 1.7 to 3, and the hydroxyl terminated liquid polymer has a viscosity of 5,000 to 2,000,000 cps and a number average molecular weight of 2,000 to 4,000.

17. Composition of claim 13 wherein amount of the liquid polymer is 1 to 30 parts by weight per 100 parts of said acid and/or anhydride and said hydroxyl-containing compound; said acid is a diacid and said acid and said anhydride are unsaturated and contain 4 to 9 carbon atoms per molecule; said hydroxyl-containing compound is a polyol selected from dihydroxyl and trihydroxyl compounds containing 2 to 12 carbon atoms per molecule; the hydroxyl terminated liquid polymer comprises epihalohydrin polymer which has a number average molecular weight of about 800 to 50,000 and viscosity of about 500 to 50,000,000 cps; and the carboxyl terminated liquid polymer has a viscosity of 500 to 2,500,000 cps with an average carboxyl group per molecule of 1.5 to 4.

18. Composition of claim 17 wherein the hydroxyl terminated liquid polymer has molecular weight of about 2,000 to 15,000, said epihalohydrin polymer is selected from homopolymers of epihalohydrin monomer, copolymers of epihalohydrin monomer and an oxide monomer containing a cyclic oxy ring, and mixtures thereof.

19. Composition of claim 17 wherein said polyester resin is in a solution of a polymerizable monomer containing 20 to 80% solids.

20. Composition of claim 15 containing a catalytic amount of a catalyst selected from the group consisting of benzoyl peroxide, tertiary butyl perbenzoate, cyclohexanone peroxide, tertiary butyl peroxide, tertiary butyl peroctoate, azoisobutyrodinitrile, and cumene hydroperoxide; and 5 to 70% fibers, based on the total weight of the composition, said fibers are selected from glass, nylon, polyester, aromatic polyamide, and mixtures thereof.

21. A shaped article comprising an unsaturated polyester resin and a polymerizable monomer, said resin being a reaction product of an acid and/or anhydride with a hydroxyl-containing compound which forms ester groups upon reaction with the acid and/or anhydride, the improvement comprising co-reacting a carboxyl or a hydroxyl terminated liquid polymer with said acid or anhydride and the hydroxyl containing compound.

22. Article of claim 21 wherein amount of the liquid polymer is 1 to 15 parts by weight per 100 parts of said acid and/or anhydride and said hydroxyl-containing compound, said carboxyl terminated liquid polymer has a viscosity of 500 to 2,500,000 cps with an average carboxyl group per molecule of 1.5 to 4, and said hydroxyl terminated liquid polymer has a viscosity of 500 to about 100,000,000 cps and a number average molecular weight of 1,000 to 6,000.

23. Article of claim 22 wherein the polyol contains 4 to 6 carbon atoms per molecule, said carboxyl terminated liquid polymer has a viscosity of 5000 to 1,200,000 cps with average number of carboxyl groups per molecule of 1.7 to 3, and the hydroxyl terminated liquid polymer has a viscosity of 5,000 to 2,000,000 cps and a number average molecular weight of 2,000 to 4,000.

24. Article of claim 21 wherein said acid is a diacid and said acid and said anhydride are unsaturated and contain 4 to 9 carbon atoms per molecule; said hydroxyl-containing compound is a polyol selected from dihydroxyl and trihydroxyl compounds containing 2 to 12 carbon atoms per molecule; the hydroxyl terminated liquid polymer comprises epihalohydrin polymer which has a number average molecular weight of about 800 to 50,000 and viscosity of about 500 to 50,000,000 cps; and the carboxyl terminated liquid polymer has a viscosity of 500 to 2,500,000 cps with an average carboxyl group per molecule of 1.5 to 4.

* * * * *